United States Patent [19]
Tattermusch

[11] Patent Number: 5,984,329
[45] Date of Patent: Nov. 16, 1999

[54] INDEPENDENT WHEEL SUSPENSION HAVING A WHEEL CARRIER SUPPORTED VIA A COUPLING ROD ON A SEMI-TRAILING ARM

[75] Inventor: Peter Tattermusch, Esslingen, Germany

[73] Assignee: DaimlerChrysler AG, Stuttgart, Germany

[21] Appl. No.: 08/971,699

[22] Filed: Nov. 17, 1997

[30] Foreign Application Priority Data

Nov. 15, 1996 [DE] Germany .............................. 196 47 303

[51] Int. Cl.⁶ ............................................ B60G 3/20
[52] U.S. Cl. ............................. 280/124.132; 280/124.126
[58] Field of Search ...................... 280/124.126, 124.128, 280/124.132, 124.134

[56] References Cited

U.S. PATENT DOCUMENTS

| | | | |
|---|---|---|---|
| 4,132,431 | 1/1979 | von der Ohe | 280/691 |
| 4,327,927 | 5/1982 | Tanaka et al. | 280/124.134 |
| 4,832,363 | 5/1989 | Mitobe | 280/124.128 |
| 4,844,505 | 7/1989 | Higuchi | 280/124.126 |
| 5,246,245 | 9/1993 | Sato et al. | 280/663 |
| 5,249,817 | 10/1993 | Bruehl | 280/94 |
| 5,257,801 | 11/1993 | Matsuzawa et al. | 280/691 |
| 5,697,633 | 12/1997 | Lee | 280/124.128 |

FOREIGN PATENT DOCUMENTS

| | | |
|---|---|---|
| 0 406 885 | 1/1991 | European Pat. Off. . |
| 2 723 887 | 3/1996 | France . |
| 26 42 939 | 3/1978 | Germany . |
| 53-43326 | 4/1978 | Japan . |
| 276805 | 12/1991 | Japan . |
| 173413 | 6/1992 | Japan . |
| 64418 | 3/1994 | Japan . |
| 2514506 | 8/1996 | Japan . |
| 1 588 760 | 4/1981 | United Kingdom . |

*Primary Examiner*—Kenneth R. Rice
*Attorney, Agent, or Firm*—Evenson, McKeown, Edwards & Lenahan, P.L.L.C.

[57] ABSTRACT

An independent wheel suspension for front wheels of a motor vehicle, having a wheel carrier which can be swivelled for steering purposes and whose first and lower joint is disposed on a semi-trailing arm and whose second joint situated above the horizontal wheel center plane is connected with a coupling rod which is supported on the semi-trailing arm in a hinged manner. Either the wheel carrier or the coupling rod is lengthened in the upward direction at least into the close surroundings of the tire tread. At the end of the lengthened portion, a hinge point is situated via which a hinged tie bar is supported on the vehicle front wall. In another variant, the crank formed by the coupling rod and the wheel carrier is supported on the spring strut of the independent wheel suspension.

10 Claims, 5 Drawing Sheets

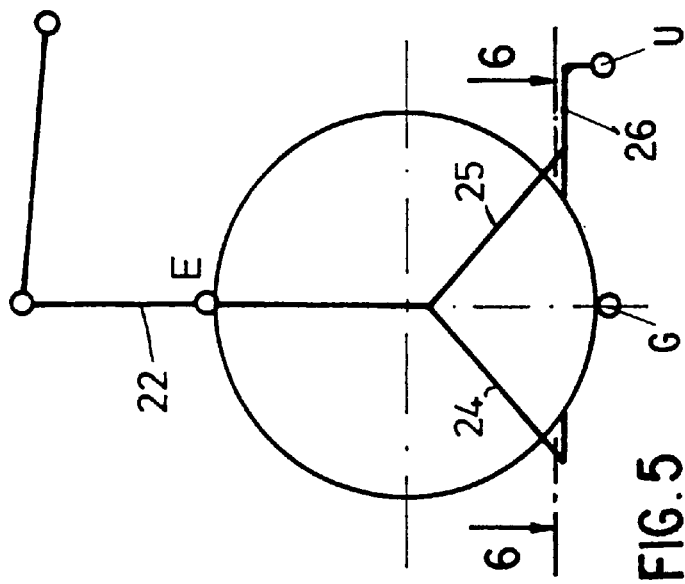
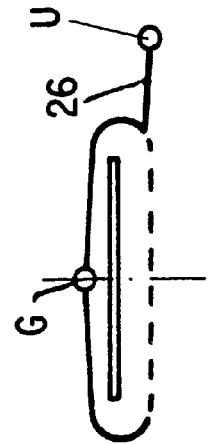
FIG. 5
FIG. 6
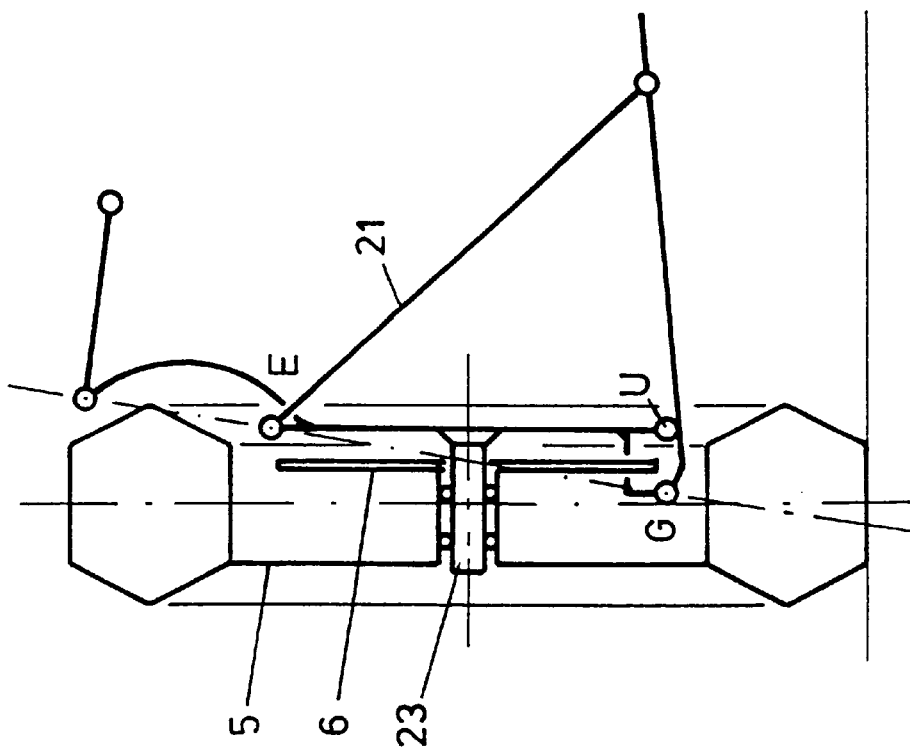
FIG. 4

INDEPENDENT WHEEL SUSPENSION HAVING A WHEEL CARRIER SUPPORTED VIA A COUPLING ROD ON A SEMI-TRAILING ARM

BACKGROUND AND SUMMARY OF THE INVENTION

This application claims the priority of German application 196 47 303.9, the disclosure of which is expressly incorporated by reference herein.

The invention relates to an independent wheel suspension for front wheels of a motor vehicle, having a wheel carrier which can be swivelled for steering purposes and whose first and lower joint is disposed on a semi-trailing arm and whose second joint situated above the horizontal wheel center plane is connected with a coupling rod which is supported on the semi-trailing arm in a hinged manner.

In the field of chassis construction, increasingly higher demands are made on the accident-caused, controllable deformability of the vehicle forward structure. Thus, it is attempted to design the side members of the vehicle such that they are upset or deformed as uniformly as possible in crash tests, among other situations. With respect to the construction of the front axle, this leads to the demand that the number of hinge points on the side member, which necessarily require a stiffening there, be minimized. As an alternative to the hinged connection to the side member, the hinge points of the control arms can be arranged on a cross member or the front wall of the passenger compartments, preferably in the area of the side members.

A front axle which, with the exception of the hinged connection of a hinged tie bar, meets this requirement is known from German Patent Document DE 26 42 939 C2. In the case of this space-saving independent wheel suspension, the wheel carrier and the coupling rod form a crank with an attached coupling hinge which crank stands on a semi-trailing arm and is swivellably disposed there about an approximately horizontal axis. On its upper joint, the wheel carrier is supported by way of an also approximately horizontally extending control arm on the wheel house or on a side member of the vehicle body. The control arm extends approximately at the level of the upper brake disk edge diagonally to the longitudinal axis of the vehicle. Because of the high control arm load during braking operations, the supporting points are particularly stiffened.

The invention is based on the need for an independent wheel suspension in which as few hinge points as possible are arranged on the side member and, in the case of a front-wall-side control arm support, relatively low forces have an effect in the hinge points situated there, if they are situated outside the side member hinging.

These and other needs have been met according to the present invention by providing an independent wheel suspension for a steerable front wheel of a motor vehicle, comprising a wheel carrier which is swivellable to steer said vehicle, said wheel carrier having a first and lower joint disposed on a semi-trailing arm and having a second joint connected with a coupling rod at a point above a horizontal center plane of the wheel, said coupling rod being hingedly supported on the semi-trailing arm, said wheel carrier including a lengthened portion extending upwardly at least to a level proximate a tread of a tire mounted on the wheel, an upper end of said lengthened portion being connected to a tie bar at an additional joint located on a line defined by said first and second joints, said tie bar being coupled to a front wall of the vehicle.

These and other needs have been met according to the present invention by providing an independent wheel suspension for a steerable front wheel of a motor vehicle, comprising a wheel carrier which is swivellable to steer said vehicle, said wheel carrier having a first and lower joint disposed on a semi-trailing arm and having a second joint connected with a coupling rod at a point above a horizontal center plane of the wheel, said coupling rod being hingedly supported on the semi-trailing arm at a hinge point, said coupling rod including a lengthened portion extending upwardly at least to a level proximate a tread of a tire mounted on the wheel, an upper end of said lengthened portion being connected to a tension strut at an additional joint located on a line defined by said hinge point and said second joint, said tension strut being coupled to a front wall of the vehicle.

These and other needs have been met according to the present invention by providing an independent wheel suspension for a steerable front wheel of a motor vehicle, comprising a wheel carrier which is swivellable to steer said vehicle, said wheel carrier having a first and lower joint disposed on a semi-trailing arm and having a second joint connected with a coupling rod at a point situated above a horizontal center plane of the wheel, said coupling rod being hingedly supported on the semi-trailing arm at a hinge point, an element of a spring strut supporting the wheel suspension being hingedly connected to the coupling rod at a point between the hinge point on the semi-trailing arm and the second joint, a lower end of the spring strut being supporting on the semi-trailing arm, an upper end of the spring strut being hingedly connected to a supporting wheel house or a front wall of the vehicle.

According to certain preferred embodiments, the coupling rod, which supports the wheel carrier on the semi-trailing arm, is lengthened upward at least into the close surroundings of the tire tread. At the end of the lengthened portion, a joint is situated on the imaginary lengthening of the section between the coupling rod hinged connection on the semi-trailing arm and the coupling rod hinged connection on the wheel carrier. On the joint, a tension bar is arranged which is supported on the vehicle front wall.

In addition, according to further preferred embodiments, the coupling rod is hinged between the hinged connection of the semi-trailing arm, which is forward when viewed in the driving direction, on the side member and the upper hinged connection on the wheel carrier in a hinged manner on an element of a spring strut supporting the wheel suspension on the vehicle body, the lower end of the spring strut being supported on the semi-trailing arm, but the upper end being fastened in a hinged manner on the supporting wheel house or the front wall.

In the first two variants, either the wheel carrier or the coupling rod is lengthened, for example, by one and a half to twice their length. As a result, the tension forces occurring in the hinged tie bar or the pull rod are reduced in comparison to the construction known from German Patent Document DE 26 42 939 C2 by approximately 33 to 50% while the angular conditions are approximately the same. A hinged connection to the vehicle front wall is therefore possible there without above-average reinforcements.

Together with the wheel carrier or the coupling rod, the lengthenings may, for example, be constructed as forged parts or sheet metal parts. Their respective design is determined, among other conditions, by stability requirements and space conditions.

The third variant will no longer require a hinged tie bar. The crank with the attached coupling hinge consisting of the coupling rod and the wheel carrier is supported on the spring strut of the front wheel suspension. This independent wheel suspension corresponds at least with respect to the spring strut to a McPherson front axle, but without the longitudinal rotation of the damper and the springing in the event of a steering angle.

Other objects, advantages and novel features of the present invention will become apparent from the following detailed description of the invention when considered in conjunction with the accompanying drawings.

BRIEF DESCRIPTION OF THE DRAWINGS

FIG. 4 is a view of an independent wheel suspension, as illustrated in FIG. 1, with a brake disk situated on the outside and a semi-trailing arm which is hinged to the wheel carrier by way of a steering arm;

FIG. 5 is a partial lateral view corresponding to FIG. 4;

FIG. 6 is a partial top view corresponding to FIGS. 4 and 5;

DETAILED DESCRIPTION OF THE DRAWINGS

Figure 1:
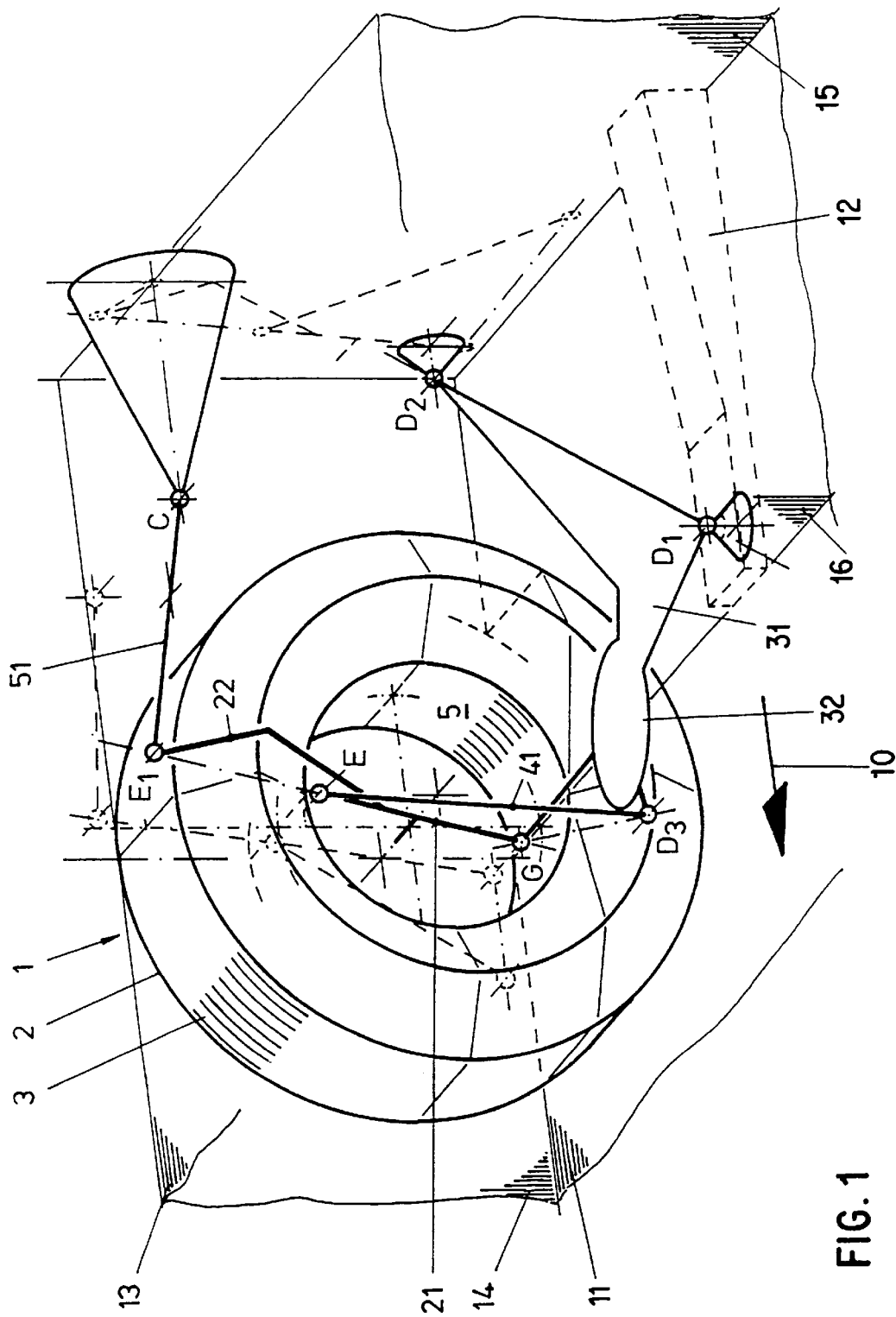
FIG. 1 is a view of an independent wheel suspension having a lengthened wheel carrier according to a preferred embodiment of the present invention.
Figure 7:
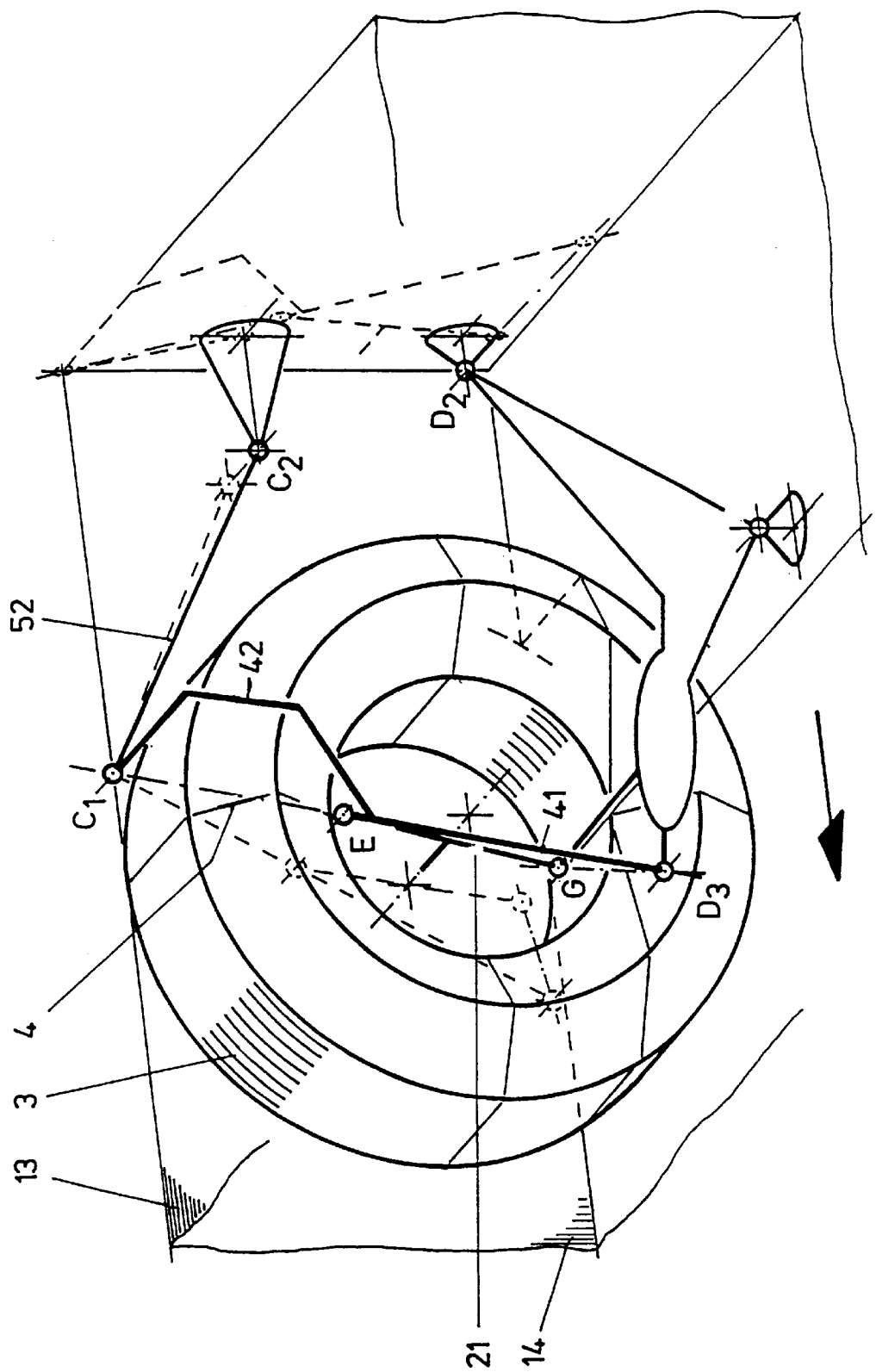
FIG. 7 is a view of an independent wheel suspension with a lengthened coupling rod.
Figure 8:
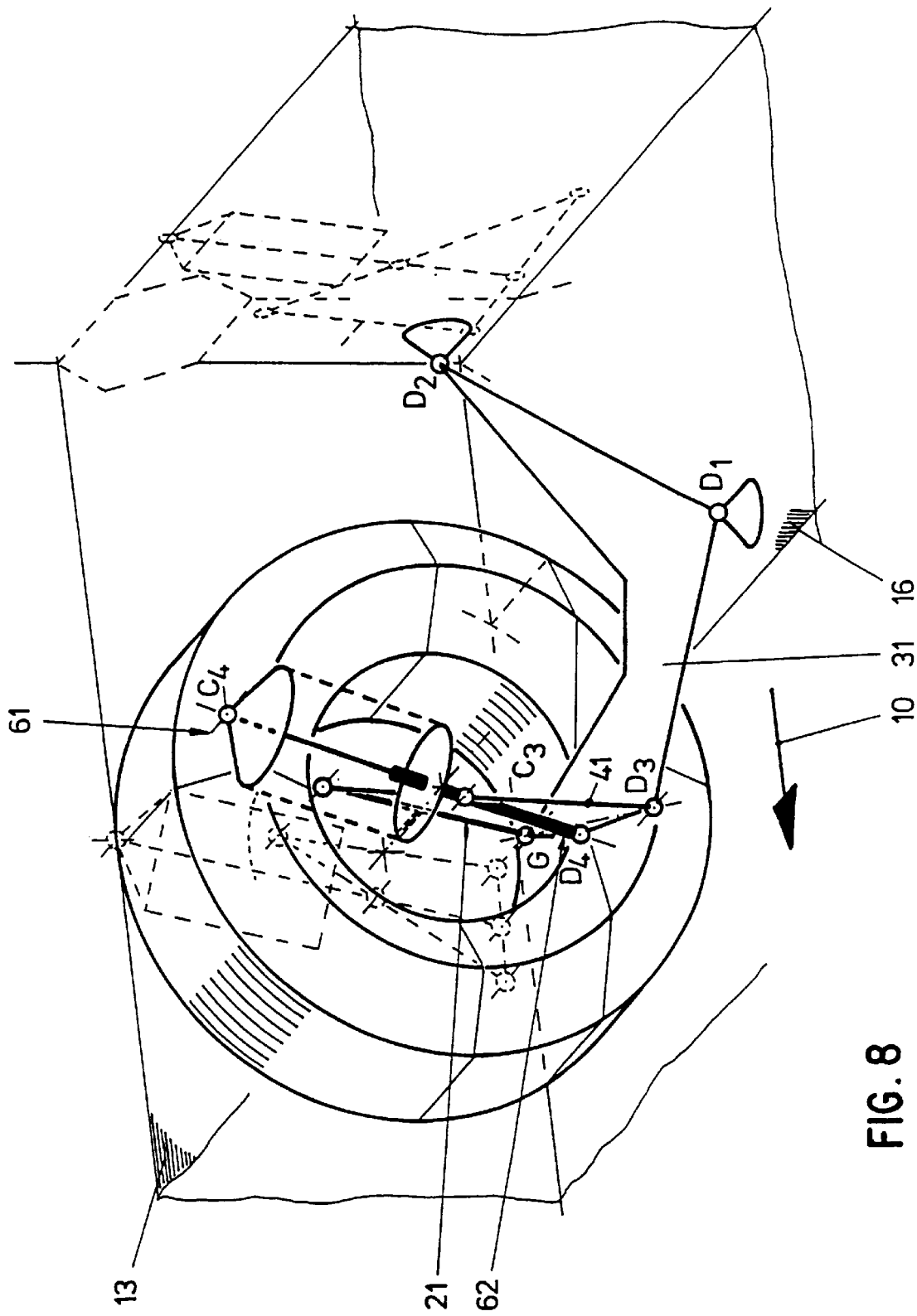
FIG. 8 is a view of an independent wheel suspension with a support of the coupling rod on a spring strut.

FIGS. 1, 7 and 8 show three variants of an independent wheel suspension in the case of which only one joint respectively is fastened to a side member. Viewed in the driving direction, the right forward independent wheel suspension with the steerable wheel 1 is illustrated. The steering arm and swivel are not shown in these figures.

To facilitate the recognition of the schematic spatial representations, several auxiliary planes are introduced into these figures. A first horizontal plane 11 is situated at the level of the interior side of the rim of the wheel 1 illustrated in the straight-ahead position. A side member 12, for example, is disposed in it. It is indicated in FIG. 1 by a broken line. A second horizontal plane 13 is situated at the level of the tire tread 13 of wheel 1.

Toward the exterior side of the wheel, the horizontal planes 11, 13 are bounded by a vertical plane 14 which is arranged at the outer edge of the tire tread 3. The front wall 15, which is symbolically illustrated as a vertical plane, is situated transversely with respect to the longitudinal direction of the vehicle. The wheel center transverse plane 16 is situated offset in parallel in front of it. This plane is not bordered in FIGS. 1, 7 and 8.

In FIGS. 1, 7 and 8, several components respectively of the individual wheel suspensions on the front walls 15 and the vertical planes 14 are illustrated as projections by broken lines.

In principle, all three independent wheel suspensions are based on a lower semi-trailing arm 31 which is slightly changed from one figure to the next. The swivelling axis of the semi-trailing arm 31 extends between the hinge points $(D_1)$ and $(D_2)$, the rearward hinge point $(D_2)$ being situated on the front wall 15, for example, in the area of the side member, while the forward hinge point $(D_1)$ is part of the side member 12 and, with respect to the driving direction 10, is arranged behind the vertical wheel center transverse plane 16. The semi-trailing arm 31 ends in the rim space of the wheel 1 in a hinge point (G) in which the lower joint of the wheel carrier 21 is disposed. With respect to the driving direction 10, this hinge point (G) is situated in front of the vertical wheel center transverse plane 16. In the area between the hinge points $(D_1)$ and (G), a zone 32 is situated in which, for example, a coil spring of the vehicle suspension or its saddle is supported. With respect to the driving direction 10 in front of this zone 32, another hinge point $(D_3)$ is fastened on the semi-trailing arm 31. At this hinge point $(D_3)$, a coupling rod 41 is hinged which supports the wheel carrier 21 at its hinge point (E). The wheel carrier 21 and the coupling rod 41 form a crank which stands on the semi-trailing arm 31 and which can be swivelled about the axis $(D_3, G)$. Here, the hinge point $(E_1)$ on the wheel carrier 21, with respect to the driving direction 10, is situated behind the vertical wheel center transverse plane 16.

In FIG. 1, the wheel carrier 21 is lengthened upwards by a wheel carrier lever 22. The upper end of the wheel carrier lever 22 guided past the rim 5 and the tire 2 forms the hinge point $(E_1)$. Together with the hinge points (G) and (E), the hinge point $(E_1)$ is situated on the steering axis 1 of the wheel and is situated behind the wheel center transverse plane 16 and above the horizontal plane 13. In the hinge point $(E_1)$, a hinged tie bar 51 is pivotally connected which is supported in a hinge point (C) on the front wall 15. The hinged tie bar 51, which forms the upper control arm of this independent wheel suspension and supports the crank formed by the wheel carrier 21 and the coupling rod 41, encloses a right angle with the steering axis $(G, E_1)$ in the embodiment. The hinge point (C) is situated below the upper horizontal plane 13.

Figure 3:
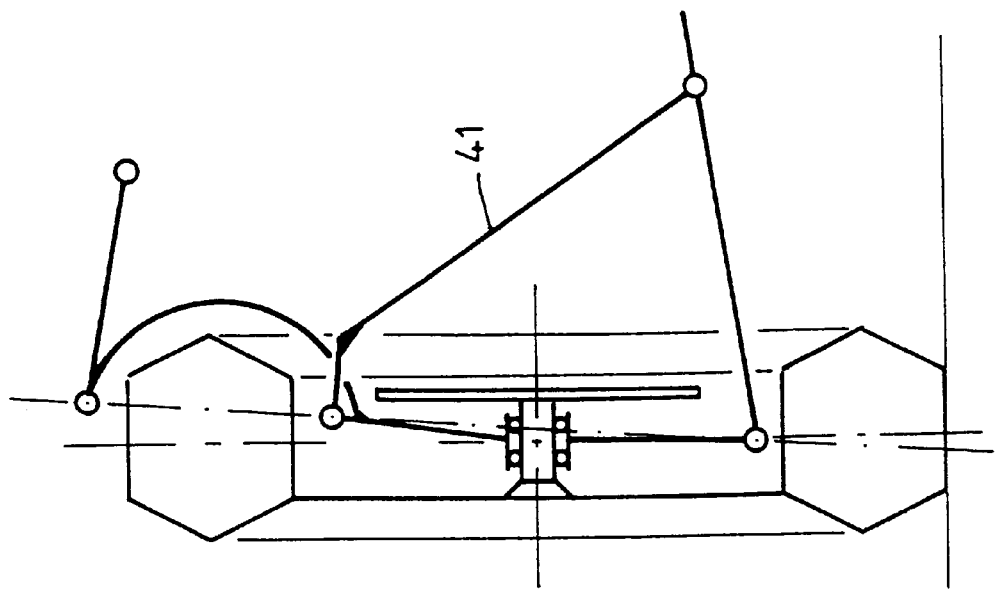
FIG. 3 is a view of the independent wheel suspension, as illustrated in FIG. 2, with a small inclination and a small negative steering offset.
Figure 2:
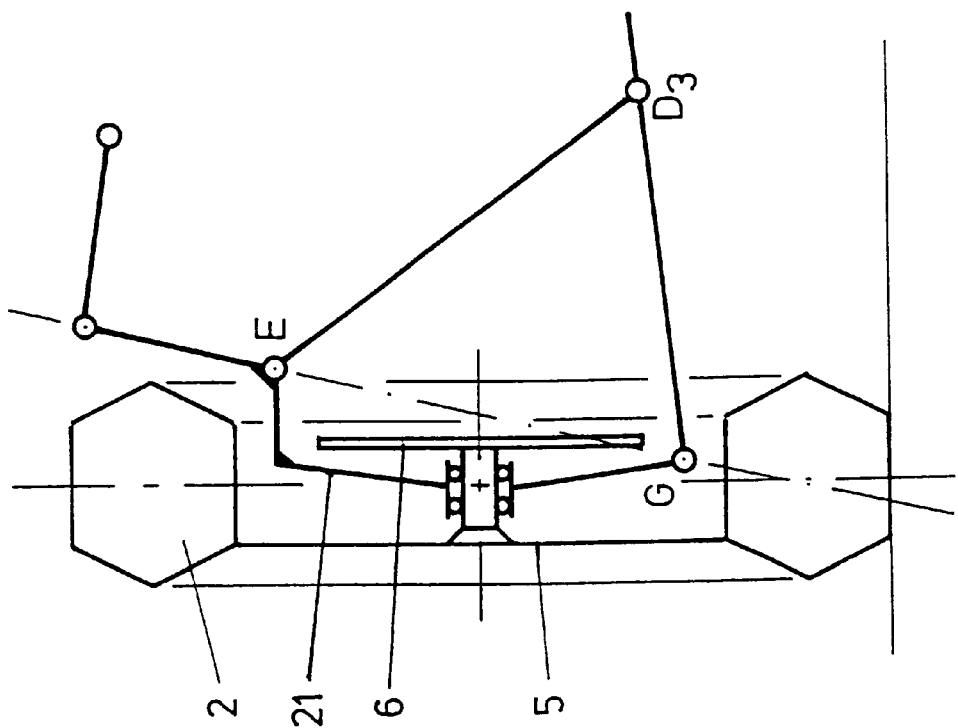
FIG. 2 is a view of the independent wheel suspension as illustrated in FIG. 1 with a brake disk offset toward the interior, a large inclination and a large negative steering offset.

FIGS. 2 and 3 each are frontal views of an independent wheel suspension in which the wheel carrier 21 is arranged between the rim 5 and the brake disk 6. In FIG. 2, the wheel carrier 21 is bent at right angles for this purpose above the brake disk 6 toward the inside so that the hinge point (E) is at least situated proximate the rim flange situated there or even outside the rim space. This construction permits a large inclination and a large negative steering offset.

In FIG. 3, the hinge point (E) is situated in the rim space between the rim 5 and the brake disk 6. For this purpose, the coupling rod 41 is constructed to be bent at approximately a right angle proximate of the hinge point (E). This variant permits a relatively small inclination while the steering offset is also negative.

FIGS. 4, 5 and 6 show an independent wheel suspension similar to FIG. 1 with a wheel carrier 21 which partially surrounds the brake disk 6. The largest portion of the wheel carrier 21 as well as the hinge point (E) are arranged axially outside the rim 5. In order to connect the lower hinge point (G) in the rim space behind the brake disk 6 with the wheel carrier 21, the latter is forked below the axle journal 23. The forked sections 24, 25 of the wheel carrier 21 meet again in the rim space behind the brake disk 6 in order to form the hinge point (G) there. This reaching around the brake disk 6, which in FIG. 6 appears as a ring deformed approximately to an oval, is simultaneously part of a steering arm 26 with its hinge point (U).

Among other things, this embodiment permits the use of a brake disk 6 which is relatively large in comparison to the rim diameter.

In contrast to FIG. 1, in FIG. 7 the coupling rod 41 is lengthened in the upward direction by the coupling rod lever 42. The coupling rod lever 42 is arranged below the hinge point (E) on the coupling rod 41 and, at an appropriate distance, follows the tire side wall 4 oriented toward the vehicle center and the tread 3. It ends in the joint ($C_1$) which in this case is situated on the intersection line between the upper horizontal plane 13 and the vertical plane 14. The hinge points ($D_3$), (E) and ($C_1$) are situated on a straight line. In the joint ($C_1$), a radius rod or tension strut 52 is suspended which supports the wheel carrier 21 together with the coupling rod 41 and the lengthened coupling rod lever 42 on the front wall 15 below the upper horizontal plane 13 at a hinge point ($C_2$). Together with the tension strut 52, the straight line ($D_3$, $C_1$) encloses, for example, a right angle.

The tension strut 52 as well as the hinged tie rod 51 may also be constructed to be curved in order to buckle in the case of an accident-caused deformation of the forward structure of the vehicle instead of penetrating into the occupant compartment. Naturally, the components 51 and 52 may also be constructed as tube frames, corrugated tubes or telescopic tubes or profiles which telescope or upset instead of buckling.

In the case of the independent wheel suspension in FIG. 8, the crank formed by the wheel carrier 21 and the coupling rod 41 is supported by means of a spring strut 61. For this purpose, the spring strut 61, for example, together with its damper tube 62, is disposed on the semi-trailing arm 31 in the area between the hinge points (G) and ($D_3$) in a hinge point ($D_4$). The hinge point ($D_4$) which, with respect to the driving direction 10, is shown situated in front of the swivelling axis (G, $D_3$), may alternatively be situated on or behind the swivelling axis.

The other, upper end of the spring strut 61 is arranged in a hinged manner, for example, in a wheel house which is not shown. In FIG. 8, the hinge point (C4) is situated in the upper horizontal plane 13 relative to the driving direction 10 behind the wheel center transverse plane 16. Between the hinge points ($D_4$) and ($C_4$), the coupling rod 41 is supported on the damper tube 62 in a hinge point ($C_3$). There, a rubber bearing, a coupling member or the like, is, for example, arranged as the supporting element.

In FIG. 8, parts of the independent wheel suspension are in each case projected onto the front wall 15 and the vertical plane 14.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An independent wheel suspension for a steerable front wheel of a motor vehicle, comprising a wheel carrier which is swivellable to steer said vehicle, said wheel carrier having a first and lower joint disposed on a semi-trailing arm and having a second joint connected with a coupling rod at a point above a horizontal center plane of the wheel, said coupling rod being hingedly supported on the semi-trailing arm, said wheel carrier including a lengthened portion extending upwardly at least to a level proximate a tread of a tire mounted on the wheel, an upper end of said lengthened portion being connected to a tie bar at an additional joint located on a line defined by said first and second joints, said tie bar being coupled to a front wall of the vehicle.

2. An independent wheel suspension according to claim 1, wherein the semi-trailing arm is hingedly connected to the front wall and a side member of the vehicle.

3. An independent wheel suspension according to claim 1, wherein said tie bar is hingedly connected to the front wall.

4. An independent wheel suspension according to claim 1, wherein said tie bar and said line defined by said first and second joints are arranged at approximately a right angle to each other.

5. An independent wheel suspension for a steerable front wheel of a motor vehicle, comprising a wheel carrier which is swivellable to steer said vehicle, said wheel carrier having a first and lower joint disposed on a semi-trailing arm and having a second joint connected with a coupling rod at a point above a horizontal center plane of the wheel, said coupling rod being hingedly supported on the semi-trailing arm at a hinge point, said coupling rod including a lengthened portion extending upwardly at least to a level proximate a tread of a tire mounted on the wheel, an upper end of said lengthened portion being connected to a tension strut at an additional joint located on a line defined by said hinge point and said second joint, said tension strut being coupled to a front wall of the vehicle.

6. An independent wheel suspension according to claim 5, wherein the semi-trailing arm is hingedly connected to the front wall and a side member of the vehicle.

7. An independent wheel suspension according to claim 5, wherein the tension strut is hingedly connected to the front wall.

8. An independent wheel suspension according to claim 5, wherein said tension strut and said line defined by said hinge point and said second joint are arranged at approximately a right angle to each other.

9. An independent wheel suspension for a steerable front wheel of a motor vehicle, comprising a wheel carrier which is swivellable to steer said vehicle, said wheel carrier having a first and lower joint disposed on a semi-trailing arm and having a second joint connected with a coupling rod at a point situated above a horizontal center plane of the wheel, said coupling rod being hingedly supported on the semi-trailing arm at a hinge point, an element of a spring strut supporting the wheel suspension being hingedly connected to the coupling rod at a point between the hinge point on the semi-trailing arm and the second joint, a lower end of the spring strut being supporting on the semi-trailing arm, an upper end of the spring strut being hingedly connected to a supporting wheel house or a front wall of the vehicle.

10. An independent wheel suspension according to claim 9, wherein the semi-trailing arm is hingedly connected to the front wall and a side member of the vehicle.

* * * * *